UNITED STATES PATENT OFFICE.

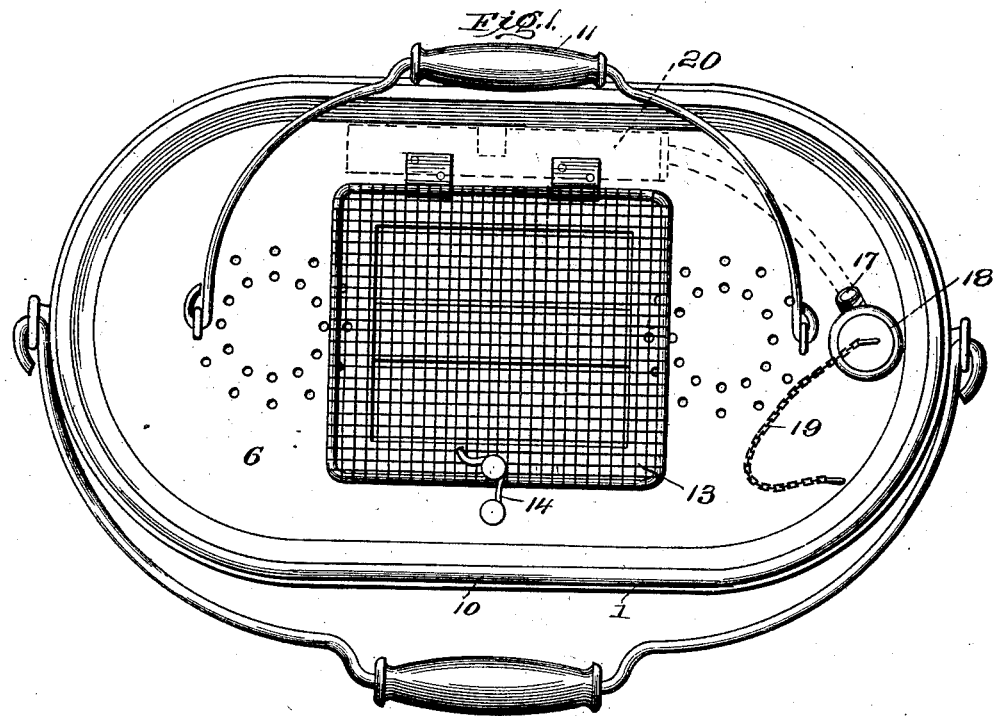
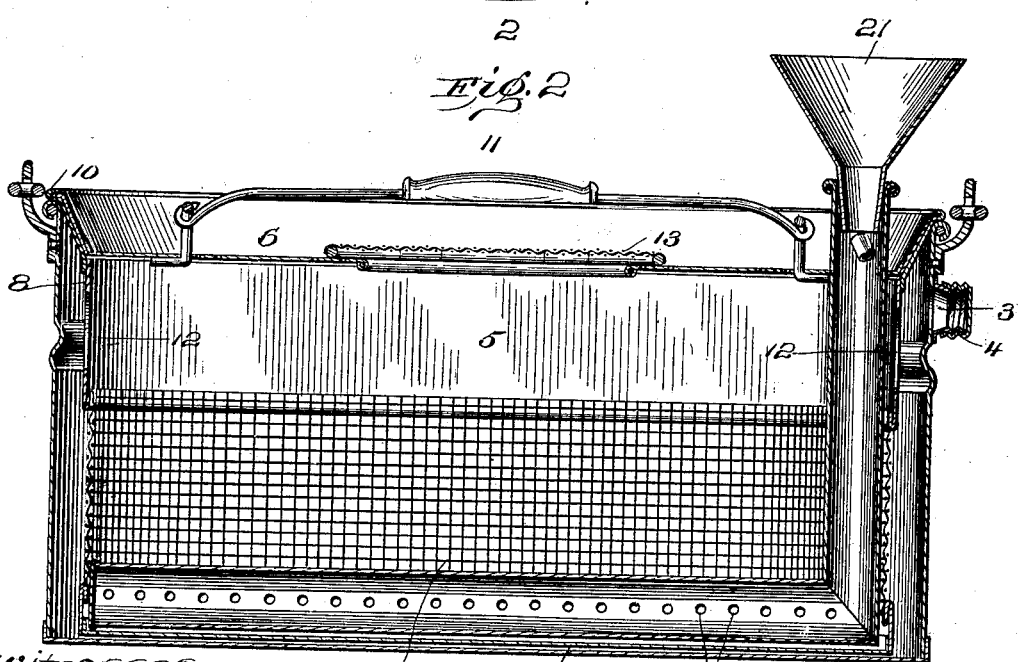

GEORGE AYERS, OF ALEXANDRIA, VIRGINIA.

BAIT-BUCKET.

SPECIFICATION forming part of Letters Patent No. 668,899, dated February 26, 1901.

Application filed December 20, 1900. Serial No. 40,567. (No model.)

*To all whom it may concern:*

Be it known that I, GEORGE AYERS, a citizen of the United States, residing at Alexandria, in the county of Alexandria and State of Virginia, have invented certain new and useful Improvements in Bait-Buckets; and I do hereby declare the following to be a full, clear, and exact description of the invention, such as will enable others skilled in the art to which it appertains to make and use the same.

This invention relates to improvements in bait-buckets in which live bait may be kept in a nearly normal condition for a considerable period of time.

The invention also relates to bait-buckets wherein live bait may be transported where a constant supply of fresh water is not easily attainable.

To this end the invention consists in providing a bait-bucket to which when stationary a constant supply of water may be introduced and during transportation and without changing the parts air may be injected in lieu of the water.

Generally speaking, the bucket consists of an outside water-tight metal can with a carrying-bail and an overflow-pipe near the top thereof, with an inner removable bait-receptacle having a perforated portion near the bottom, a supporting-bail, and a trap-door for the introduction and removal of the bait. Within the receptacle is a tube with an upper extremity and a perforated continuation at the bottom. This continuation passes entirely along the bottom of the receptacle. The open end of the vertical tube may support a funnel for holding ice. An air-compressing pump may be attached to this extremity or to a nipple adjacent thereto. In the latter case when using the pump the opening will be closed by a stopper or cork.

In order to better understand the nature of the invention, attention is called to the accompanying drawings, in which—

Figure 1 is a top view of the complete bucket, and Fig. 2 is a vertical longitudinal section.

In both views like parts are designated by the same numerals of reference.

The bucket consists of the outer water-tight can 1, substantially of the shape shown, provided with a bail 2 and an overflow-pipe 3. The latter may be covered by a cap 4.

Within the can 1 is supported a receptacle 5. This latter has a sheet-metal top 6, a sheet-metal bottom 7, and continuous sides and ends, formed at the upper part of sheet metal 8 and the lower part 9 of wire-gauze or its equivalent. The receptacle is provided with a flange 10, which rests over and is supported on the upper edge of the outside can and makes a nearly tight joint therewith.

11 is a bail attached to the receptacle.

12 represents perforated portions of the sheet-metal part of the receptacle, arranged adjacent to the ends thereof.

13 is a trap hinged to the top 6 and provided with a latch or fastening 14.

A vertical pipe 15, passing through the top of the receptacle down to the bottom thereof, continues as a horizontal arm, perforated at 16, as shown. An internally-screw-threaded nipple 17 is secured to and connects with that portion of the pipe 15 which extends above the top of the receptacle. A cork 18, connected to the receptacle by a chain 19, may be used to close the open end of the pipe 15.

A hand air-compressing pump 20 may be attached to the nipple 17 by a flexible tube. Any of the pumps now on the market for inflating bicycle-tires may be used in lieu of the pump 20.

21 is a funnel which may contain ice.

My invention is used in the following manner: The parts are assembled as shown, the cork 18 and the cap 4 being removed and a continuous stream of water from a suitable source being allowed to pass into the pipe 15, filling the receptacle and can and overflowing through the pipe 3. The live bait may be introduced through the trap 13 into the receptacle 5. The bait will live under normal conditions, as a fresh supply of water continuously enters at the bottom through the perforations in the pipe 15 and passes off at the top through the openings 12. During transportation the cap 4 and cork 18 are replaced. Air can be introduced at intervals by means of the pump 20. This air will answer to some extent as a substitute for the water.

If desired, the funnel 20 may be substituted for the cork, and being filled with ice the latter will melt and introduce a continuous supply of cold water through the bottom of the receptacle.

While the bucket is being used the receptacle can be removed from the can and carried overboard.

I am aware that bait-buckets have hitherto been made in which a constant supply of fresh water has been introduced through a perforated pipe near the bottom. I am also aware that bait-cans have been produced in which a supply of air could be injected. This I do not claim broadly; but What I do claim is—

1. In a bait-bucket, an outside, water-tight case with an overflow therein, a cover for said overflow, a removable bait-receptacle having a flange 10 thereon resting upon the upper edge of the outside can, a perforated pipe within said receptacle, and an air-compressing pump attached thereto, substantially as set forth.

2. An improvement in bait-cans, an outside, water-tight can 1, having an overflow 3 with a cap 4 thereon, an inner receptacle 5 with perforations below the top thereof, and a flange 10 resting upon the upper edge of the outside casing, a perforated tube 15 within the receptacle, an offset 17 thereon for the attachment of a compressing-pump, and a closure 18, substantially as set forth.

3. An improvement in bait-cans, an outside, water-tight can 1, having an overflow 3 with a cap 4 thereon, an inner receptacle 5 with perforations below the top thereof, and a flange 10, resting upon the upper edge of the outside casing, a perforated tube 15 within the receptacle, an offset 17 thereon for the attachment of a compressing-pump, a closure 18, and a funnel 21, substantially as set forth.

This specification signed and witnessed this 18th day of December, 1900.

GEORGE AYERS.

Witnesses:
LEONARD HUNTRESS DYER,
HUGH M. STERLING.